Aug. 2, 1960
J. P. NICHOLSON
2,947,284
CONE VALVE
Filed July 8, 1958
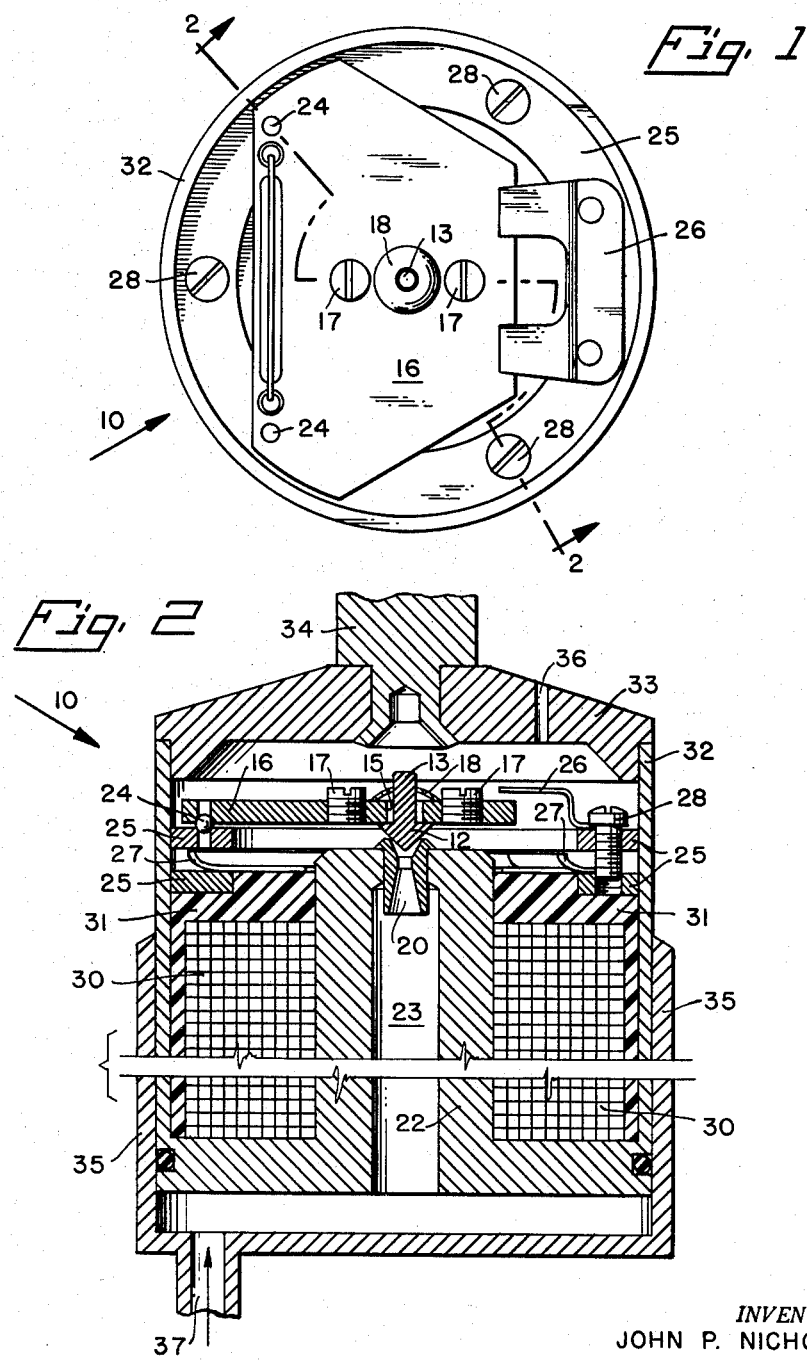
INVENTOR.
JOHN P. NICHOLSON
BY
ATTORNEYS

United States Patent Office 2,947,284
Patented Aug. 2, 1960

2,947,284
CONE VALVE

John P. Nicholson, China Lake, Calif., assignor to United States of America as represented by the Secretary of the Navy Filed July 8, 1958, Ser. No. 747,317
2 Claims. (Cl. 121—38)
(Granted under Title 35, U.S. Code (1952), sec. 266)

The invention described herein may be manufactured and used by or for the Government of the United States of America for governmental purposes without the payment of any royalties thereon or therefor.

This invention relates to control valves and particularly to a gas pressure valve which is self-aligning and provides constant flow.

The control valve of the present invention is controlled by an electro-magnet having a solenoid coil and a hollow core through which the gases pass. A cone valve is mounted for lateral motion on a pivoted armature to provide self-aligning with respect to a beveled seat or valve nozzle cup in the bore of the core. The seat and cone valve are maintained clean by the flow of gases at high velocity over the surfaces thereof.

The purpose of the present invention is to control the back pressure downstream from the valve. The pressure is then converted into a force acting along the longitudinal axis of the solenoid coil and hollow core; the gas pressure will be proportional to the current applied to the solenoid coil. This type of control valve is stable for all conditions of pressure and current, and has no areas of stagnation pressure buildup. The stagnation pressure is eliminated by controlling the angle of the valve nozzle cup and the angle of the valve cone so that there is a constant expansion from the smallest diameter of the nozzle, thus preventing the buildup of dirt in critical areas as in prior art valves. The old type of valves had the following disadvantages: the valves were unstable in that the nozzle and valve permitted buildup of dirt in critical areas reducing the ability of the valve to close and increase the back pressure; the valve could not be aligned with the nozzle; and the valve could not readily be repaired or protected from corrosion. The present control valve overcomes these disadvantages and provides a non-corrosive valve that can be calibrated prior to assembly and can be replaced when necessary.

It is an object of the invention to provide a new and improved gas pressure control valve which is self-aligning and provides constant gas flow.

Another object of the invention is to provide an electro-magnetically controlled gas pressure control valve which is maintained clean by the flow of gases at high velocity over the surfaces thereof.

Another object of the invention is to provide a gas pressure control valve which prevents the buildup of dirt in critical areas which would prevent the valve from closing.

A further object of the invention is to provide a gas pressure control valve which is readily repaired with simple replaceable parts.

Other objects and many of the attendant advantages of this invention will be readily appreciated as the same become better understood by reference to the following detailed description when considered in connection with the accompanying drawing wherein:

Fig. 1 shows a top view of the control valve when the piston cap is removed;

Fig. 2 is a cross-sectional side view of the control valve showing a portion of the piston in which the valve is used, taken along the line 2—2 of Fig. 1.

Referring now to the drawings like numerals refer to like parts in each of the figures.

In Figures 1 and 2 is shown the portion of a piston head 10 in which the control valve is used. A valve cone 12 having a protruding shaft portion 13 which is inserted into opening 15 in valve plate 16 is held in place by a keeper spring 18. The valve cone 12 is self-aligning with the top of valve nozzle cup 20 by having opening 15 in valve plate 16 larger than the diameter of shaft 13 of the valve cone and by allowing keeper-spring 18 to slide on the surface of the valve plate.

The valve nozzle cup 20 is positioned along the centerline of piston 10 at the end of piston rod 22. Gas flows through the piston rod to valve nozzle 20 through gas passage 23. The nozzle causes constant expansion of the gas from the smallest diameter to the exit at the top of the nozzle, thus maintaining a high gas velocity. Valve cone 12 is carried on valve plate 16 which is hinged on ball hinge 24 positioned between top leveling ring 25 and the valve plate. The valve cone is limited in vertical movement by valve stop 26 which limits the movement of the valve plate, but is free to self-align itself with the nozzle.

The leveling rings have a spring 27 therebetween to keep them separated and are adjusted by means of leveling screws 28.

Piston rod 22 has a wire coil 30 wound thereabout forming an electromagnet or solenoid coil. The entire assembly which includes the piston rod, solenoid coil, nozzle valve cup and valve cone is encased in a piston casing 32. Potting compound 31 holds the solenoid coil, piston rod and lower leveling ring. Piston casing 32 has a cap 33 and piston pointer or thrust rod 34 at the upper end thereof; cap 33 is provided with an exhaust port 36. The entire piston 10 slides within a piston cylinder 35.

The gas flowing through nozzle 20 is divided by the point of valve cone 12 and escapes around the top of the nozzle. A change in back pressure is caused by the changing area of the opening between the top of nozzle 20 and valve cone 12. The gas velocity along the surface of the valve cone is zero when the valve is completely closed, i.e., when there is no opening between the top of the nozzle and the valve cone. However, the valve normally operates at some partially open condition. The gas velocity along the surface of the cone is maintained high by controlling the angle between the exit angle of the nozzle and the valve cone. Thus there is no area of stagnation in the valve except at the point of the valve cone. Any dirt that tends to coat the surface of the valve cone is broken away due to the slicing angle of contact between valve cone 12 and nozzle 20. Further, the high velocity of the gas flowing along the valve plate prevents attraction of the flow to the face of the piston rod thus eliminating any dirt build up in that area about the valve at the outer top end of the nozzle.

The control valve of the present invention operates as follows: Gas flows into the piston cylinder by way of the gas inlet 37 through the passage 23 in piston rod 22 and through valve nozzle 20 past valve cone 12 at approximately a constant rate at steady state flow. The solenoid coil 30 about piston rod 22 builds up a magnetic field when an electric current is applied thereto; the path of the magnetic field is through piston rod 22, the air-gap between the face of the piston rod at the valve nozzle end and valve plate 16, the valve plate and top leveling ring 25, to the piston cap and case 33 and 32, and returning to the piston rod. Magnetic trim screws 17 are provided in valve plate 16 which can be used to vary the air-gap magnetic flux path to the face of the piston rod.

The gas flowing through the valve causes a force to act on the valve cone. An equal and opposite force is created between valve plate 16 and the face of piston rod 22. Any variation in current flowing in coil 30 will vary the magnetic force which closes the valve; when the magnetic force created is greater than the force of the gas pressure the valve will close. The relation between the valve cone and valve nozzle is maintained by adjusting the distance between the ball hinge 24 and the valve cone. The keeper spring 18 allows shaft 13 of the valve cone to center itself in the nozzle by means of hole 15 in the valve plate being larger than the shaft of the valve cone. Leveling of the valve cone with the nozzle is maintained by adjusting leveling screws 28 with the valve in operation until the valve can completely close off the flow of gas.

This control valve operates at all conditions of gas flow and current without becoming unstable. With this control valve the buildup of dirt that caused malfunction of prior art valves has been eliminated. The present valve can be adjusted to give any gain curve normally expected in use and be stable under all conditions of normal usage. By maintaining a high gas velocity in all ports of the valve, gas is not allowed to form areas of stagnation where large deposits of dirt from the products of combustion can effect the operation of the valve.

In different embodiments of the invention the valve could be adjusted and the valve cone locked in place by using a nut in place of the keeper spring; further, the nozzle could be machined into the piston rod rather than be made as a separate part to be inserted in the face of the piston rod.

Obviously, many modifications and variations of the present invention are possible in the light of the above teachings. It is, therefore, to be understood that within the scope of the appended claims the invention may be practiced otherwise than as specifically described.

What is claimed is:

1. A control device including a piston cylinder having an inlet, a piston casing slidably disposed in said piston cylinder, said piston casing including a cavity, a hollow piston rod interconnecting said inlet and said cavity, said piston rod having an upper plane surface forming part of the cavity surface, a convergent-divergent nozzle disposed in the hollow section of said hollow piston rod and the divergent section extending through and above said upper plane surface, a valve plate pivotally mounted in said cavity and spaced above and parallel to said upper plane surface, said valve plate entirely covering said plane surface and having a hole axially aligned with said divergent nozzle section, a valve having a cone and a stem, the angle of the apex of said valve cone being greater than the angle of the apex of the cone forming the divergent nozzle section, said stem being of lesser diameter than said hole and mounted in said hole with the cone extending towards said divergent nozzle section thereby providing self-alignment, means for exerting a force on said valve cone for controlling the flow through said nozzle whereby gas flow past said nozzle and between said valve plate and said plane surface is laminar and buildup of dirt from gas at the end of said divergent section is prevented.

2. The device of claim 1 wherein said means for exerting a force includes an electric coil disposed around said hollow piston rod whereby varying the current through said coil varies the flux across the space between said valve plate and said plane surface thus varying the force applied to said valve cone.

References Cited in the file of this patent

UNITED STATES PATENTS

| 1,622,672 | Raymond | Mar. 29, 1927 |
| 2,830,743 | Rimsha et al. | Apr. 15, 1958 |

FOREIGN PATENTS

| 416,244 | Great Britain | Sept. 13, 1934 |